No. 855,593. PATENTED JUNE 4, 1907.
R. W. STARLING.
GUANO DISTRIBUTER.
APPLICATION FILED MAR. 7, 1907.

Robert W. Starling,
INVENTOR.

WITNESSES:

By C.A. Snow & Co.
ATTORNEYS

UNITED STATES PATENT OFFICE.

ROBERT W. STARLING, OF BERRIEN COUNTY, GEORGIA.

GUANO-DISTRIBUTER.

No. 855,593.  Specification of Letters Patent.  Patented June 4, 1907.

Application filed March 7, 1907. Serial No. 361,085.

*To all whom it may concern:*

Be it known that I, ROBERT W. STARLING, a citizen of the United States, residing in the county of Berrien and State of Georgia, have invented a new and useful Guano-Distributer, of which the following is a specification.

This invention has relation to guano distributers and it consists in the novel construction and arrangement of its parts as hereinafter shown and described.

The object of the invention is to provide a distributer of the character indicated which is provided with a hopper pivotally mounted upon the frame, said hopper having a suitable outlet over which is located an adjustable gate. The forward portion of the frame of the implement is supported by a ground wheel which is provided with a series of laterally extending pins concentrically arranged upon the wheel. An arm is attached to the hopper and is adapted to engage successively the pins as the wheel rotates. A spring is attached at one end to one of the beams of the implement and is connected with the free end of said arm and is under tension so as to normally have a tendency to hold the forward end of the hopper depressed and the rear end thereof, which is provided with the outlet elevated. A lever mechanism is mounted upon the implement and which may be operated to swing the hopper upon its pivots so as to elevate the forward end thereof and hold the said arm beyond the path of the said pins. When this is done the material will cease falling from the hopper as it will be deprived of its oscillating movement.

Figure 1:
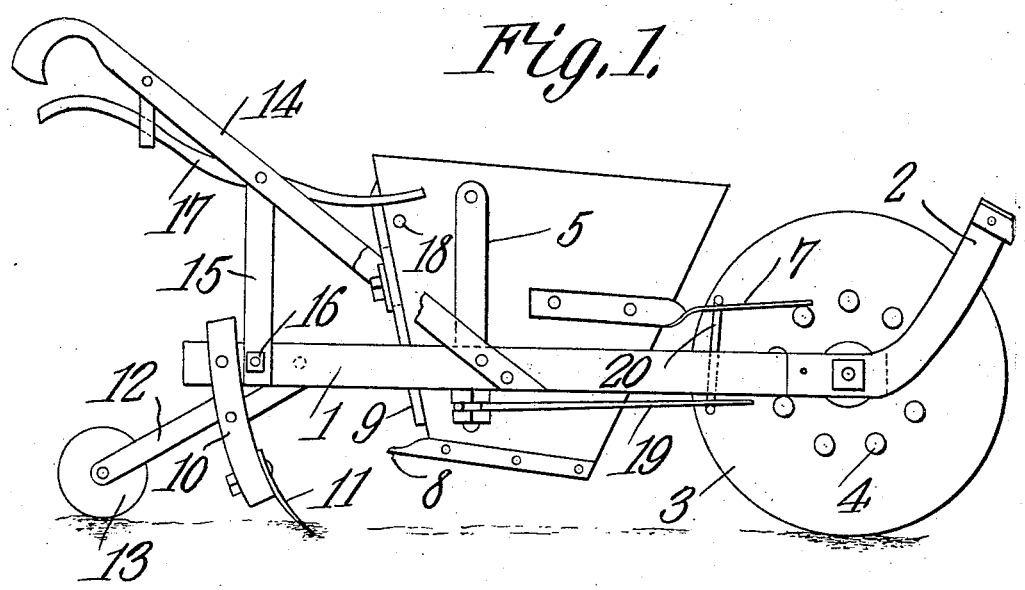
Figure 2:
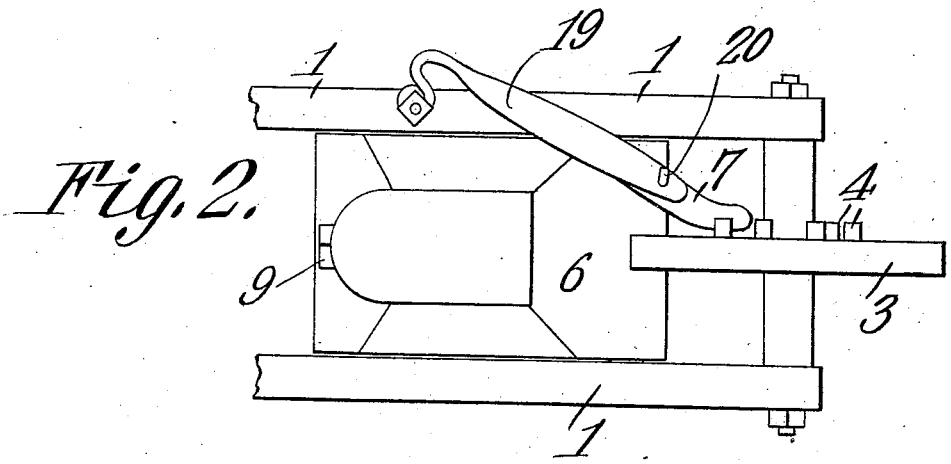

In the accompanying drawing:—Figure 1 is a side elevation of the distributer, and Fig. 2 is a bottom plan view of a portion of the same.

The distributer comprises the side beams 1 which are connected together at their forward ends by the yoke 2. The ground wheel 3 is journaled for rotation between the forward portions of said beams and is provided upon one of its sides with a series of pins 4 which are concentrically arranged. The uprights 5 are attached to the beams 1 and the hopper 6 is pivoted between the upper ends of said uprights. The pivotal point of the hopper is preferably located in the upper rear quarter of the same. The arm 7 is fixed at one end to the side of the hopper 6 and its forward end normally lies in the path of the pins 4. The hopper is provided at its lower rear sides with an outlet 8 and upon its rear side with an adjustable gate 9 which is adapted to be moved in order to increase or diminish the transverse area of the said outlet. The standards 10 depend from the rear ends of the beams 1 and are provided with plow points 11. The arms 12 are pivoted at their upper ends to the inner side of the rear portions of the beams 1 and the roller 13 is journaled between the lower ends of said arm. The handles 14 are fixed at their lower ends to the outer side of the beams 1 at intermediate points thereof. The braces 15 extend from the handles 14 to the beams 1 and are attached thereto by means of a rod 16 which extends transversely across the implement from one beam to the other. The lever 17 is fulcrumed upon one of the handles 14 and its working end lies upon the pin 18 which is attached to the side of the hopper 6.

The operation of the implement is as follows: The fertilizing material is placed in the hopper 6 and the gate 9 is adjusted. As the implement is drawn over the ground the pins 4 successively come in contact with the arm 7 and each pin elevates the free end of the said arm and the forward portion of the hopper. As each pin passes beyond the arm the tension of the spring 19 which is fixed at one end to one of the beams 1 and is connected at its other end by means of the link 20 with the said arm draws the arm down and forces it in contact with the next pin. Thus the forward end of the hopper is moved down and brought to a sudden stop. The jolt incidental thereto causes the material to fly or fall from the outlet 8. The above operation is repeated as each pin 4 comes in contact with the arm 7 and thus the hopper 6 is oscillated but is given a decided jolt each time its rear end is elevated. The material that is deposited upon the ground is covered with earth by the plow points 11 and the roller 13 passes over the ridge thus made and rolls the material into the soil. By reason of the peculiar manner in which the hopper is pivoted the material will be expelled therefrom even though it be wet and soggy. If at any time it should be desired that the hopper cease dropping the material as the implement is moving over the ground the operator swings the lever 17, the working end of which will bear down upon the pin 18 and swing the hopper 6 upon its pivot so that the forward end of the arm 7 will be above or beyond the path of the pins 4. Thus the hopper will be deprived of its oscillating movement and will retain the material contained therein.

Having described my invention what I claim as new and desire to secure by Letters Patent is:—

A fertilizer distributer comprising a wheel mounted frame, a hopper pivotally supported upon the frame, an arm attached to the hopper, a series of pins attached to the wheel of the frame, said arm normally lying in the path of said pins, a spring attached at one end to the frame and a link connecting said spring with the said arm.

In testimony that I claim the foregoing as my own, I have hereto affixed my signature in the presence of two witnesses.

ROBERT W. STARLING.

Witnesses:
 IRA E. WEBB,
 WILLIAM H. STARLING.